US007415443B2

(12) United States Patent
Hobson et al.

(10) Patent No.: US 7,415,443 B2
(45) Date of Patent: Aug. 19, 2008

(54) ONLINE CARD PRESENT TRANSACTION

(75) Inventors: Carol Lee Hobson, New River, AZ (US); Sohail M Hussain, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 11/860,356

(22) Filed: Sep. 24, 2007

(65) Prior Publication Data
US 2008/0010217 A1 Jan. 10, 2008

Related U.S. Application Data

(62) Division of application No. 09/943,658, filed on Aug. 30, 2001, now Pat. No. 7,292,999.

(60) Provisional application No. 60/276,173, filed on Mar. 15, 2001.

(51) Int. Cl.
 *H04L 9/00* (2006.01)
(52) U.S. Cl. .............................. 705/65; 706/76; 726/20
(58) Field of Classification Search ............... 726/20; 705/65, 76
See application file for complete search history.

(56) References Cited

U.S. PATENT DOCUMENTS

| 5,475,585 | A | 12/1995 | Bush |
| 5,557,518 | A | 9/1996 | Rosen |
| 5,559,887 | A | 9/1996 | Davis et al. |
| 5,590,197 | A | 12/1996 | Chen et al. |
| 5,715,314 | A | 2/1998 | Payne et al. |
| 5,724,424 | A | 3/1998 | Gifford |
| 5,754,655 | A | 5/1998 | Hughes et al. |
| 5,778,067 | A | 7/1998 | Jones et al. |
| 5,883,810 | A * | 3/1999 | Franklin et al. ............. 700/232 |
| 5,903,882 | A * | 5/1999 | Asay et al. .................... 705/44 |
| 5,930,767 | A | 7/1999 | Reber et al. |
| RE36,310 | E | 9/1999 | Bjerrum et al. |
| 5,995,626 | A | 11/1999 | Nishioka et al. |
| 5,999,624 | A | 12/1999 | Hopkins |

(Continued)

FOREIGN PATENT DOCUMENTS

EP 0940675 9/1999

OTHER PUBLICATIONS

David Essex, USB Adapter Handles 100-mbps Nets, special to PC World. PC World Online. San Francisco: Sep. 27, 1999. p. 1.*

(Continued)

*Primary Examiner*—Andrew J. Fischer
*Assistant Examiner*—Joshua Murdough
(74) *Attorney, Agent, or Firm*—Snell & Wilmer L.L.P.

(57) ABSTRACT

An online card-present transaction system facilitates card-present type transactions with a merchant over a public network. A host system is configured to accept authentication data from a user via an authentication device. The host system, after authenticating a user is configured to retrieve the user's account information from a user database system and translate a user account number into a temporary transaction number. The temporary transaction number is then transmitted directly from the host system to the merchant, thereby eliminating the need for the user to send to the merchant over the internet, the user's transaction account number.

20 Claims, 5 Drawing Sheets

U.S. PATENT DOCUMENTS

| | | | |
|---|---|---|---|
| 6,000,832 A | 12/1999 | Franklin et al. | |
| 6,012,049 A | 1/2000 | Kawan | |
| 6,029,141 A | 2/2000 | Bezos et al. | |
| 6,072,870 A | 6/2000 | Nguyen et al. | |
| 6,092,078 A * | 7/2000 | Adolfsson | 707/102 |
| 6,098,053 A * | 8/2000 | Slater | 705/44 |
| 6,101,483 A | 8/2000 | Petrovich et al. | |
| 6,105,008 A | 8/2000 | Davis et al. | |
| 6,163,841 A * | 12/2000 | Venkatesan et al. | 713/176 |
| 6,175,922 B1 * | 1/2001 | Wang | 713/182 |
| 6,182,894 B1 | 2/2001 | Hackett et al. | |
| 6,182,900 B1 | 2/2001 | Wiehler | |
| 6,192,349 B1 | 2/2001 | Husemann et al. | |
| 6,205,437 B1 | 3/2001 | Gifford | |
| 6,282,656 B1 * | 8/2001 | Wang | 726/4 |
| 6,308,887 B1 * | 10/2001 | Korman et al. | 235/379 |
| 6,327,578 B1 | 12/2001 | Linehan | |
| 6,421,768 B1 | 7/2002 | Purpura | |
| 6,456,984 B1 * | 9/2002 | Demoff et al. | 705/40 |
| 2001/0034720 A1 * | 10/2001 | Armes | 705/65 |
| 2001/0039535 A1 * | 11/2001 | Tsiounis et al. | 705/71 |
| 2001/0044787 A1 | 11/2001 | Shwartz et al. | |
| 2002/0007320 A1 | 1/2002 | Hogan et al. | |
| 2002/0035548 A1 | 3/2002 | Hogan et al. | |
| 2002/0046092 A1 | 4/2002 | Ostroff | |
| 2002/0128977 A1 | 9/2002 | Nambiar et al. | |

OTHER PUBLICATIONS

Tait, Fiona and Robert H. Davis; The Development and Future of Home Banking: International Journal of Bank Marketing, v7n2, p. 3-9, 1989.*

EVM '96; Ver. 3.1.1; May 31, 1998.*

Menezes, et al., "The Handbook of Applied Cyrptography," 1996, pp. 397-405.

Schultz, Keith, "Network Infrastructure-SSL in the Driver's Seat," InternetWeek, Nov. 13, 2000, Issue 837, p. 49.

Sandberg, Jared, "Visa, Mastercard Reach an Agreement for Single System of Internet Payment," Wall Street Journal, New York, NY, Feb. 1, 1996, p. B2.

* cited by examiner

ONLINE CARD PRESENT TRANSACTION

CROSS REFERENCE TO RELATED APPLICATIONS

This application is a divisional of and claims priority to U.S. Non-Provisional application Ser. No. 09/943,658, entitled "ONLINE CARD PRESENT TRANSACTION", filed on Aug. 30, 2001, which application claims priority to and the benefit of U.S. Provisional Application Ser. No. 60/276,173, filed Mar. 15, 2001, which are hereby incorporated by reference.

FIELD OF INVENTION

The present invention relates generally to a system and method for facilitating a card present transaction over a distributed network, such as the internet; and more particularly, to a system for improving the automation and security of online transactions by enhancing consumer authentication via an improved authentication process and more securely transmitting consumer transaction data between a host system and a merchant.

BACKGROUND OF THE INVENTION

The proliferation of the Internet has resulted in a thriving electronic commerce industry, where more and more products and services are available to consumers in a variety of non-traditional systems (e.g., internet, telephone sales, wireless, interactive TV, and/or the like). For example, in online consumer-merchant transactions, consumers typically provide merchants with transaction account numbers (e.g., charge or credit card numbers) from their existing debit, phone, credit or other transaction accounts (e.g., American Express®, VISA®, MasterCard® and Discover Card®, AT&T®, MCI®, and/or the like). Transmission of transaction numbers via these non-traditional systems has typically created increased opportunities for fraud because of, inter alia, (1) the difficulty in authenticating the possessor of the account number to ensure that he or she is lawfully entitled to use this number, and (2) an increased opportunity for the account number to be intercepted either en route to the merchant or, once at the merchant's site, by an unscrupulous merchant employee or other third party.

Unlike a typical "card-present" transaction where a consumer is present at a merchant's retail establishment and presents a physical charge card to the merchant, the merchant in an online or other remote transaction does not physically see the consumer nor the consumer's charge card. As such, in an online transaction, the merchant is not typically able to appropriately verify the charge number on the card, does not appropriately verify the signature/photograph on the card, and does not have sufficient capability to ask for other forms of identification. Since it has often been difficult to adequately authenticate a person in possession of a charge card in an online transaction, it is often possible for a stolen card to be used over and over again without the merchant having the opportunity to sufficiently verify the cardholder's identity.

However, even if sufficient authentication was practical, the transaction number could still be intercepted in transit to the merchant or stolen at the merchant's location. For example, it is possible for these numbers to be intercepted during transmission, after transmission, or while being stored electronically at the merchant's online or offline location. In light of the increase in fraud involving situations where the physical transaction card is not actually presented to the merchant, consumers are becoming increasingly cautious and reluctant about disclosing their transaction number to merchants (or other unknown third parties asserting to be merchants).

In conducting traditional online purchases, consumers often browse the internet for items to purchase. A consumer generally identifies goods and/or services for purchase by viewing an online advertisement such as a hypertext markup language (HTML) document provided via a World Wide Web (WWW) browser. When the consumer finds an item that he or she is interested in purchasing, the consumer typically selects an item to add to a virtual shopping cart. When the consumer has finished shopping, and desires to purchase an item, the consumer usually proceeds to a virtual checkout, where the consumer is prompted for payment and delivery information. The consumer then typically enters the appropriate delivery and transaction account information, wherein the transaction account number is typically obtained directly from the consumer's physical transaction card. This information is typically transmitted electronically to the merchant over a public network such as the internet via a secure channel such as a secure sockets layer (SSL) connection. The SSL standard is described by, for example, "The SSL Protocol Version 3.0," dated Nov. 18, 1996, which is available online at http://home.netscape.com/eng/ssl3/draft302.txt, the entire contents of which are incorporated herein by reference. The merchant then processes the transaction account number by, for example, receiving direct authorization from the card issuer, completing the transaction, and submitting a record of charge (ROC) and/or summary of charges (SOC) to the card issuer or acquirer for settlement. While the authorization process (authorization code provided to merchant) may occur contemporaneously with the transaction, the settlement process is generally accomplished by a batch process during periodic intervals.

Although millions of transactions take place every day via the internet, conventional SSL transactions often exhibit a number of marked disadvantages. Although SSL typically provides a secure end-to-end connection that prevents unscrupulous third parties from eavesdropping (e.g., "sniffing") or otherwise obtaining a purchaser's transaction account number, the protocol does not provide any means for ensuring that the transaction account number itself is valid, or that the person providing the number is legally authorized to do so. Because of the high incidence of fraud in online internet transactions, most charge card issuers consider network transactions to be "Card Not Present" transactions subject to a higher discount rate. Stated another way, because of the increased risk from online or otherwise remote transactions, most transaction card issuers charge the merchant a higher rate for accepting card numbers via electronic means than would be charged if the card were physically presented to the merchant.

To improve the security deficiencies inherent in transporting charge card numbers over unsecured networks, many have suggested the use of "smart cards". Smart cards typically include an integrated circuit chip having a microprocessor and memory for storing data directly on the card. The data can correspond to a cryptographic key, for example, or to an electronic purse that maintains an electronic value of currency. Many smart card schemes have been suggested in the prior art, but these typically exhibit a marked disadvantage in that they are non-standard. In other words, merchants typically must obtain new, proprietary software for their Web storefronts and point of sale (POS) terminals to accept smart card transactions. Moreover, the administration costs involved with assigning and maintaining the cryptographic information associated with smart cards have usually been excessive to date. Therefore, traditional methods have been impractical and have failed to adequately address the security problems inherent with the transmission of transaction data over a distributed network from the user to the merchant.

Systems to expedite the transaction process typically utilize online digital wallets to store user data and to profile merchant web payment and delivery fields by "scraping" or "crawling" the merchant's website. In other words, the host system physically directs its computer systems to go to the merchant's website and record the payment and delivery fields used by the merchant. This information is then stored by the host system in a database and retrieved as desired when a consumer desires to make a purchase from a given merchant. When the consumer desires to make a purchase from a particular merchant, the host system recognizes the merchant in the database, retrieves the merchant profile, and transfers the appropriate consumer data to the appropriate merchant fields.

One of the problems associated with scraping or crawling the merchant's website to determine the profile of merchant payment and delivery fields is that each merchant's fields are often configured differently. For example, while one merchant may have one continuous web page with all desired information on that web page, other merchants may require the completion of several web pages to complete the transaction process. Complicating the problem of the varying types of web payment pages that must be profiled, is the fact that certain merchants routinely modify their payment web pages without notice to the host system—with some merchants changing their payment web pages weekly or even daily. Therefore, the host system must frequently "scrape" or "crawl" dozens or even hundreds of merchant websites to ensure that the web page field definitions remain up-to-date and that the host system can correctly communicate the appropriate information into the proper locations.

Thus, as more and more merchants have entered the online marketplace, existing online digital wallet technology and merchant profiling has failed to keep pace. As such, traditional transaction automation techniques are inefficient and burdensome.

Therefore, a need exists for a method and system to facilitate an online "card present" transaction and to eliminate the burdensome and inefficient online digital wallet and merchant profiling techniques.

SUMMARY OF THE INVENTION

This invention improves on traditional ways of conducting online or remote transactions by providing a system and method for conducting an online "card-present" transaction that authenticates the consumer (referred to herein as "user") and facilitates the secure exchange of consumer payment and delivery information between a merchant and a host system while reducing or eliminating the need for an online wallet and/or merchant profiling. In particular, a user desiring to conduct a transaction with a merchant over a computerized network is redirected to a host system, which issues a challenge string to the user. The user inserts a smart card into a smart card reader and enters an appropriate PIN. The challenge string is signed and transmitted with the digital certificate to the host system, where the user is authenticated. The host system next retrieves the user's transaction account information (e.g., credit card account) from a user database. The host system then generates a temporary transaction number and associates the temporary number with the user's transaction account. The temporary transaction number and other related payment and delivery information is then transmitted from the host system to the merchant via an authenticated communication channel. This authenticated communication channel may be established by several methods, including various cryptographic techniques. In an exemplary embodiment, the appropriate account information data (e.g., transaction number, etc.) and/or a token signature is embedded within a user's browser and transmitted from the host system to the merchant by redirecting the user's browser to the merchant site. Once at the merchant site, the merchant decodes this token with a public key, thereby confirming the origination and authenticity of the account information data. In another exemplary embodiment, the merchant, upon receiving the temporary transaction number and data from the user's browser, queries the host system through a second communication channel to confirm the authenticity of the transaction data. Once the communication channel is confirmed, transaction data may be confidently transmitted from the host system to the merchant. Because an established line of communication is contemplated, the merchant payment and delivery fields are known and profiling (scraping or crawling) the website is not necessary.

BRIEF DESCRIPTION OF THE DRAWINGS

Additional aspects of the present invention will become evident upon reviewing the non-limiting embodiments described in the specification and the claims taken in conjunction with the accompanying figures, wherein like reference numerals denote like elements.

DETAILED DESCRIPTION OF EXEMPLARY EMBODIMENTS

The present invention involves a system and method for improving the exchange of electronic data and information between a user, a merchant and a host system which reduces or eliminates the need for merchant profiling.

Figure 1:
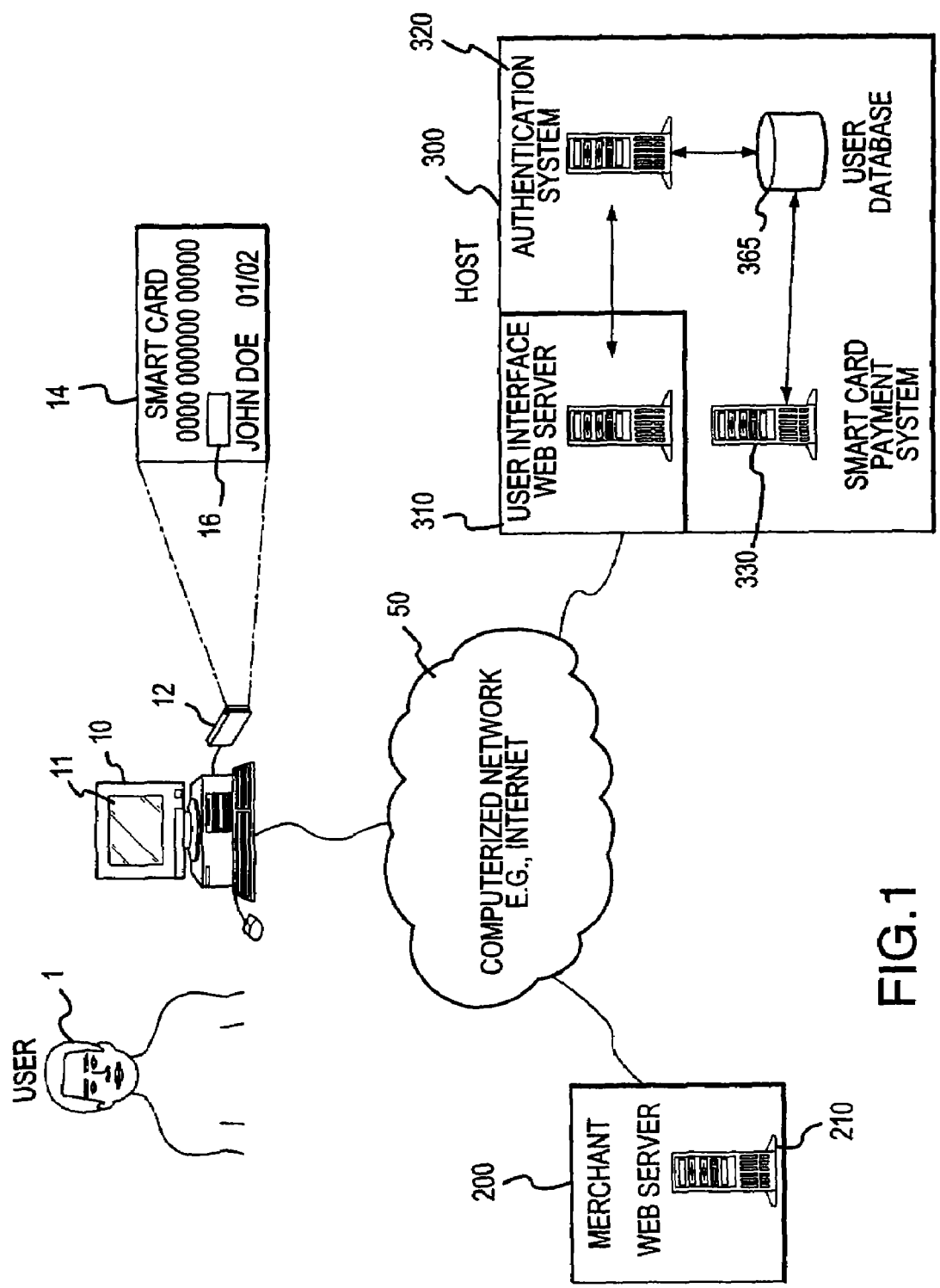
FIG. 1 is a block diagram of exemplary components of the present invention.
Figure 2A:
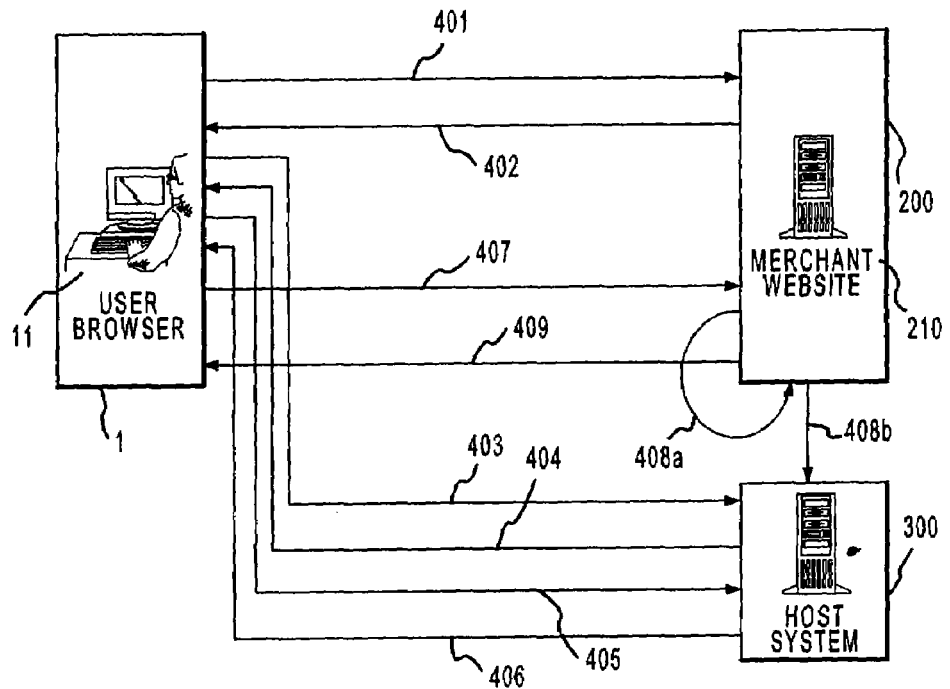
FIGS. 2a and 2b are schematic illustrations of the process flow of exemplary embodiments of the present invention.
Figure 2B:
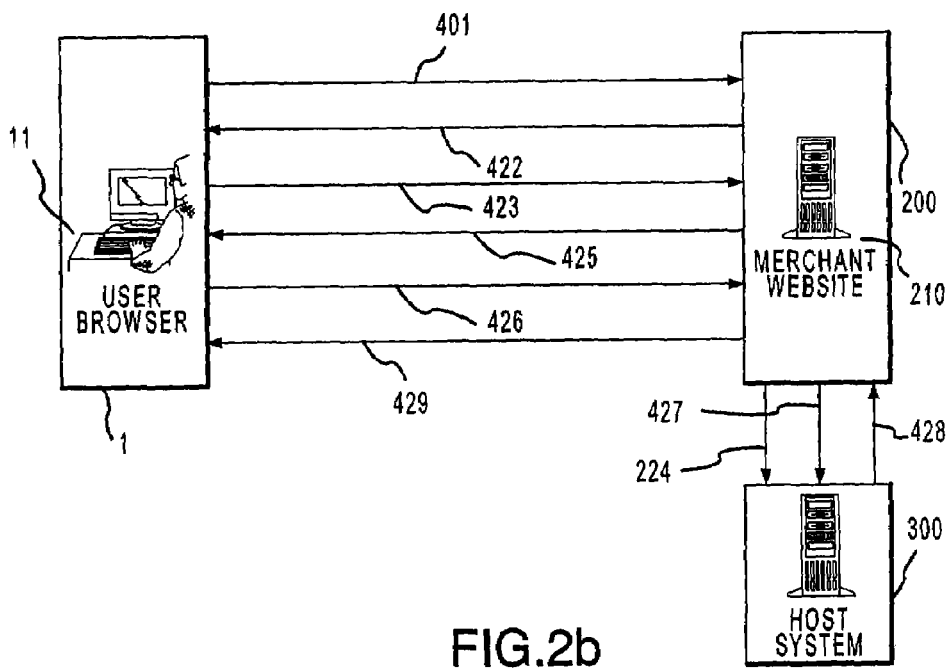

As depicted in FIGS. 1, 2a and 2b, exemplary embodiments of this invention include improved systems and methods for exchanging transaction data between a transaction account member (user 1), a merchant 200, and an account provider (host system 300), in order to improve the security, efficiency and speed of an online transaction. In essence, this system and method provides the opportunity for the parties to a transaction to facilitate a "card-present" type transaction even though the user 1 and the merchant 200 may not be at the same physical location. As described in the background section, a card-present transaction typically involves the physical act of providing a transaction card such as a credit card to a store clerk to complete a transaction, while a "card not-present" transaction (e.g., online transaction) generally involves the transmission of a credit card number from the cardholder to the merchant via the internet. In a typical online transaction, the cardholder enters his or her credit card number in an appropriate field on the merchant's website, and the number is transmitted to the merchant over the internet—the credit card provider is usually not involved with the initial transaction process between the cardholder and the merchant.

In an exemplary embodiment of this invention, the need to transmit the transaction account number (e.g., credit card number) directly from the user 1 to the merchant 200 is minimized, or even eliminated. This invention generally involves the host system 300 identifying and authenticating the user 1 and then retrieving the user's account information (e.g., credit card number) from a host system database. In one embodiment, the host system 300 generates a secondary transaction number, associates this number with the user's account, and transmits the number to a merchant 200 via a communication channel. This communication channel offers increased security, where the merchant 200 is able to verify that the host system 300 sent the number and that the number is appropriately associated with the authenticated user 1. The present invention offers significant advantages over traditional ways of facilitating transactions in that the present invention does not require the transmission of an account number over the internet from the user 1 to the merchant 200; rather, in an exemplary embodiment, a host system 300 transmits an account number to the merchant 200 via a more secure communication channel. Additionally, in an exemplary embodiment of this invention, the user's actual account number is not transmitted over the internet 50; rather, a temporary or limited use number ("secondary transaction number") is generated and substituted for the user's actual account number. Because the online card-present transaction system contemplates a more secure and direct line of communication between the host system 300 and the merchant 200, there is less possibility for online fraud. Thus, the present invention enables the user 1 to conduct a more secure "card-present" type transaction with a merchant 200 from virtually any location. For example, a user 1 is able to conduct a secure "card-present" type transaction with a merchant 200 via a personal computer, a wireless-enabled personal data assistant, an interactive television device, an electronic kiosk, a smart card enabled wireless web tablet, a smart card enabled screen phone, a RFID transponder, and/or the like. Additionally, since the merchant payment and delivery fields may be known to the host system, the time-consuming and expensive process of merchant profiling is minimized, or even eliminated.

The present invention includes a unique system for facilitating transactions that is adaptable to existing commercial transaction processing systems. While the system may contemplate upgrades or reconfigurations of existing processing systems, changes to user 1 (e.g., cardholder) or merchant 200 systems are minimized by the present invention. For example, the present invention may contemplate, but does not necessarily require: downloading of software modules; a digitally-based, non-physical commerce card; activation or deactivation of the secondary transaction number; use of a smart card and smart card reader; and certain embodiments do not require the existing online consumer to separately register for the service. Moreover, the transaction system herein described can be seamlessly integrated into current electronic commerce processes with minimal changes to existing systems used by users 1 or merchants 200.

The online card-present transaction system of the present invention may be described herein in terms of functional block components, flow charts, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, XML, ActiveX, or the like, with the various algorithms being implemented with any combination of data structures, objects, processes, routines or other programming elements. Further, it should be noted that the present invention may employ any number of conventional techniques for data transmission, signaling, data processing, network control, and the like.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction and merchant interface system.

It will be appreciated that many applications of the present invention could be formulated. Although the terms "online" or "internet" are used herein to refer to a computerized network, one skilled in the art will appreciate that a network may include any system for exchanging data or transacting business, such as the Internet, an intranet, an extranet, WAN, LAN, satellite or wireless communications, and/or the like.

The user 1 may interact with the host system's transaction system or a merchant via any input device such as a telephone, keyboard, mouse, kiosk, personal digital assistant, touch screen, voice recognition device, transponder, biometrics device, handheld computer (e.g., Palm Pilot®), cellular phone, web TV, web phone, blue tooth/beaming device, and/or the like). Similarly, the invention could be used in conjunction with any type of personal computer, network computer, workstation, minicomputer, mainframe, or the like, running any operating system, such as any version of Windows, Windows NT, Windows 2000, Windows 98, Windows 95, MacOS, OS/2, BeOS, Linux, UNIX, or the like. Moreover, although the invention uses protocols such as TCP/IP to facilitate network communications, it will be readily understood that the invention could also be implemented using IPX, Appletalk, IP-6, NetBIOS, OSI or any number of existing or future protocols or platform services, such as SOAP, WDSL, UDDI, and/or the like. Moreover, the system contemplates the use, sale, exchange, transfer, or any other distribution of any goods, services or information over any network having similar functionality described herein.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having a computer-readable program code means embodied in the storage medium. Any suitable computer-readable storage medium may be utilized, including hard disks, CD-ROM, optical storage devices, magnetic storage devices, flash card memory, and/or the like.

Communication between the parties (e.g., user 1, host system 300, and/or merchant 200) to the transaction and the system of the present invention may be accomplished through any suitable communication means, such as, for example, a telephone network, intranet, internet, point of interaction device (point of sale device, personal digital assistant, cellular phone, kiosk, and/or the like), online communications, offline communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, digital security systems and/or the like.

The present invention is described below with reference to block diagrams and schematic illustrations of methods, apparatus (e.g., systems), and computer program products according to various aspects of the invention. It will be understood that each functional block of the block diagrams and the schematic illustrations, and combinations of functional blocks in the block diagrams and schematic illustrations, respectively, can be implemented by computer program instructions. These computer program instructions may be loaded on to a general purpose computer, special purpose computer, or other programmable data processing apparatus to produce a machine, such that the instructions which execute on the computer or other programmable data processing apparatus create means for implementing the functions specified in the schematic block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the schematic block or blocks. The computer program instructions may also be loaded on to a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the schematic block or blocks.

Accordingly, functional blocks of the block diagrams and schematic illustrations support combinations of means for performing the specified functions, combinations of steps for performing the specified functions, and program instruction means for performing the specified functions. It will also be understood that each functional block of the block diagrams and schematic illustrations, and combinations of functional blocks in the block diagrams and schematic illustrations, can be implemented by either special purpose hardware-based computer systems which perform the specified functions or steps, or suitable combinations of special purpose hardware and computer instructions.

Referencing the computer networked aspect of a preferred embodiment of this invention, each participant may be equipped with a computing system 10 to facilitate online commerce transactions. The computing units may be connected with each other via a data communication network. In the illustrated implementations, the network is embodied as the internet 50. In this context, the computers may or may not be connected to the internet 50 at all times. For instance, the user 1 computer may employ a modem to occasionally connect to the internet, whereas the host system 300 computing center might maintain a permanent connection to the internet 50. It is noted that the network may be implemented as other types of networks, such as an interactive television (ITV) network.

The merchant 200 computer system and host system 300 computers may be interconnected via a second network, referred to as a payment network. The payment network represents existing proprietary networks that presently accommodate transactions for credit cards, debit cards, and other types of financial/banking cards. The payment network is a closed network that is assumed to be secure from eavesdroppers. Examples of the payment network include the American Express®, VisaNet®, and the Veriphone® network.

Figures 3A, 3B:
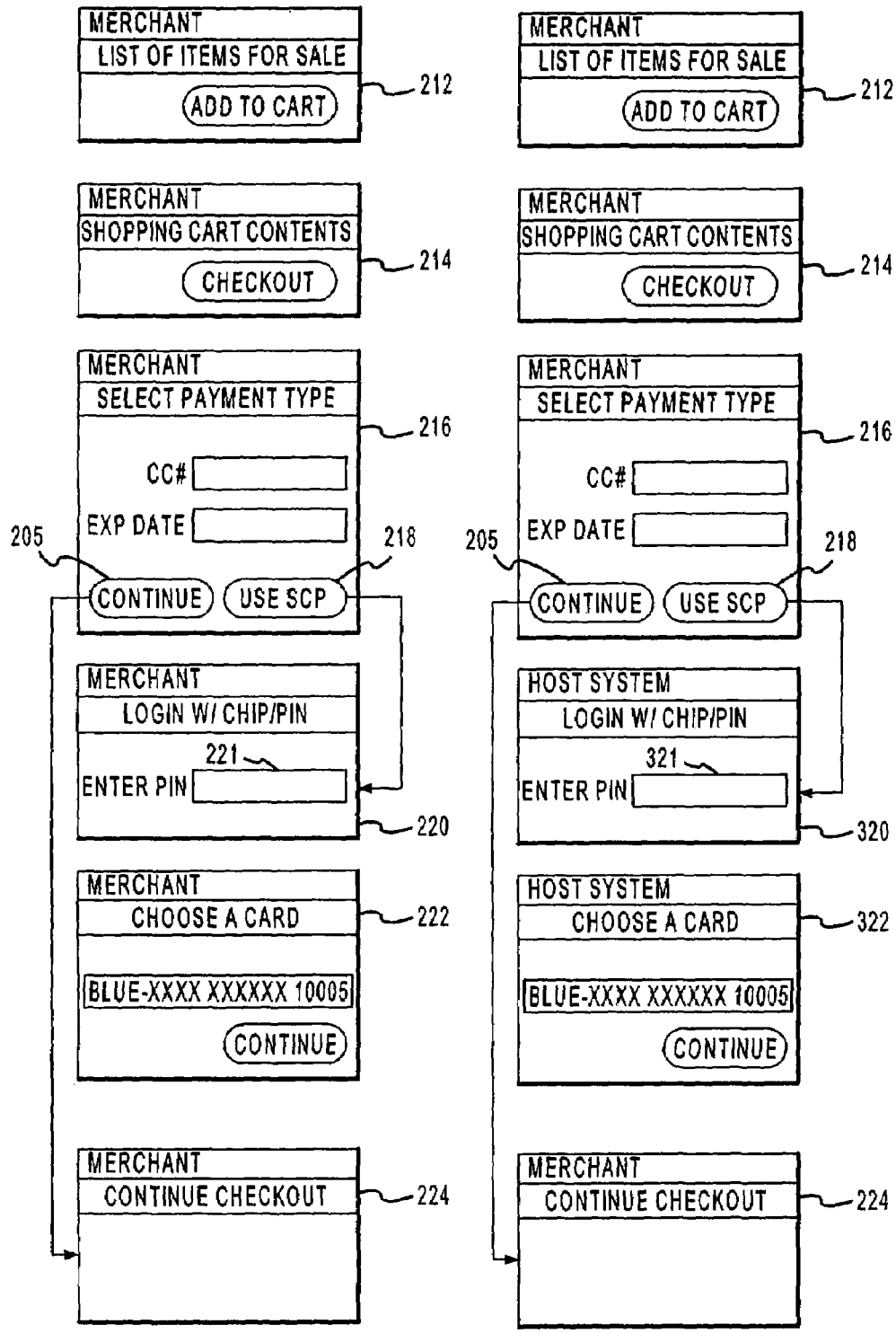
FIGS. 3a and 3b are abbreviated screen shots depicting the online process of exemplary embodiments of the present invention.

FIGS. 1 and 2a-b are general block diagrams illustrating the key parties and exemplary processes of the present invention. FIGS. 3a-b illustrate simplified web screen shots illustrating exemplary user browser interfaces. The following detailed description first describes exemplary components of the present invention followed by exemplary processes.

The user 1, as defined herein, includes any entity, person, business, software and/or hardware that communicates with a computerized network to facilitate a transaction. The user 1 includes transaction account, charge and credit card holders, consumers, purchasers, and/or the like. The user 1 communicates with the merchant 200 and host system 300 via a communication device 10, which is suitably configured to access a computerized network. As noted above, the communication device 10 may include any computerized device such as a personal computer, personal data assistant, automated teller machine, electronic kiosk, wireless tablets, RFID transponder, and/or the like. In an exemplary embodiment, as shown in FIG. 1, the communication device 10 is a personal computer that is suitably configured with, or may communicate with, an authentication device, such as a smart card reader 12, that is capable of reading a smart card 14. The smart card 14 may have a processing or storage processor or microchip 16 embedded thereon. An example of a smart card 14 is the Blue from American Express™ credit card offered by American Express®. An exemplary smart card 14 of the present invention is able to facilitate, inter alia, the authentication process using, for example, two-factor authentication employing an X509 standard cryptographic certificate in combination with a PIN. The digital certificate may be released or unlocked by the user 1 inserting the smart card 14 into the smart card reader 12 and providing the proper personal identification number (PIN). In this exemplary system, the communication device 10 is configured with software to enable the smart card reader 12 to read the smart card 14 data and to communicate a signed challenge string and digital certificate to the host system 300 and/or merchant 200.

"Smart card" 14, as defined herein, includes any type of transaction, authentication, and/or financial instrument (e.g., charge card, credit card, loyalty card, identification card, stored value card, and/or the like) that is capable of storing, generating, and/or transmitting digital certificates or other authentication information so that the host system 300 and/or merchant 200 is able to better authenticate and identify the user 1. The smart card 14 may be issued to the user 1 by the host system 300 or by the merchant 200. In an exemplary embodiment, a microchip 16 (also known as a smart chip) is affixed to the smart card 14, allowing data (e.g., a digital certificate) to be stored by the smart card and then read by the smart card reader 12 and transmitted via the internet 50 to a host system 300, merchant 200, and/or any other authorized third party. The smart card facilites authentication of the user 1. For example, using two-factor authentication, a digital certificate identifies the user-specific smart card and a user-specific PIN number identifies the user 1. In an exemplary embodiment, the microchip 16 stores a digital certificate assigned by the host system 300. For added security, in an exemplary embodiment, the host system sends the user a challenge string (e.g., code with time-stamped feature) to the user 1. When the user 1 enters his or her PIN number the digital certificate is accessed, the challenge string is signed and returned, along with the digital certificate, to the host system 300.

Although one embodiment of this invention contemplates a microchip enabled smart card 14, it is important to recognize that other readable and/or read/write data storage and retrieval means are possible (e.g., optical scanner, bar code, bar code reader, and/or the like). As will be apparent to one of skill in the art, it may be desirable for some embodiments to utilize a bar code and bar code reader or other similar, yet alternative means of storing and reading data. Other authenticating methods and devices included within the scope of this invention, which may or may not be incorporated within the processing functions and capabilities of the smart card device, include retinal, voice, fingerprint or other biometric identification/recognition devices, challenge/password, and/or the like.

As noted above, the smart card 14 includes any transaction and/or financial instrument such as loyalty cards, gift cards, stored value cards, and/or the like. For more information on loyalty systems, smart card systems, transaction systems, and electronic commerce systems, see, for example, a method and system for using loyalty points as disclosed in U.S. Ser. No. 09/834,478, filed on Apr. 13, 2001, the Shop AMEX™ system as disclosed in U.S. Ser. No. 60/230,190, filed Sep. 5, 2000; a digital wallet system as disclosed in U.S. Ser. No. 09/652,899, filed Aug. 31, 2000; a stored value card as disclosed in U.S. Ser. No. 09/241,188, filed on Feb. 1, 1999; a system and method for facilitating the handling of a dispute as disclosed in U.S. Ser. No. 09/537,506, filed on Mar. 29, 2000; a system for facilitating transactions using secondary transaction numbers as disclosed in Ser. No. 09/800,461, filed on Mar. 7, 2001; methods and apparatus for illuminating a transaction card as disclosed in U.S. Ser. No. 09/734,098, filed Dec. 11, 2000; smart card systems as disclosed in U.S. Ser. No. 60/232,040, filed on Sep. 12, 2000; and U.S. Pat. Nos. 5,742,845, 5,898,838 and 5,905,908, owned by Datascape, all of which are incorporated herein by reference.

The merchant 200, as defined herein, is any hardware, software, system, entity, person and/or business suitably configured to provide goods or services to users via a computerized network such as the internet 50. The merchant 200 system includes hardware and software components such as web servers, application servers and databases to facilitate the online shopping presence (i.e., a shopping website 210). In the online embodiment, the merchant shopping website 210 is a virtual shopping page accessible to the user 1 via the user's web browser 11. To facilitate the present invention, the merchant 200 is suitably configured with software (e.g., code string) that is able to detect host system user files associated with smart card reader 12 software. Upon detecting the user's smart card reader 12, the merchant system triggers the appearance of a smart card payment button 218 (FIGS. 3a-b) on the user's web browser 11.

Figure 4:
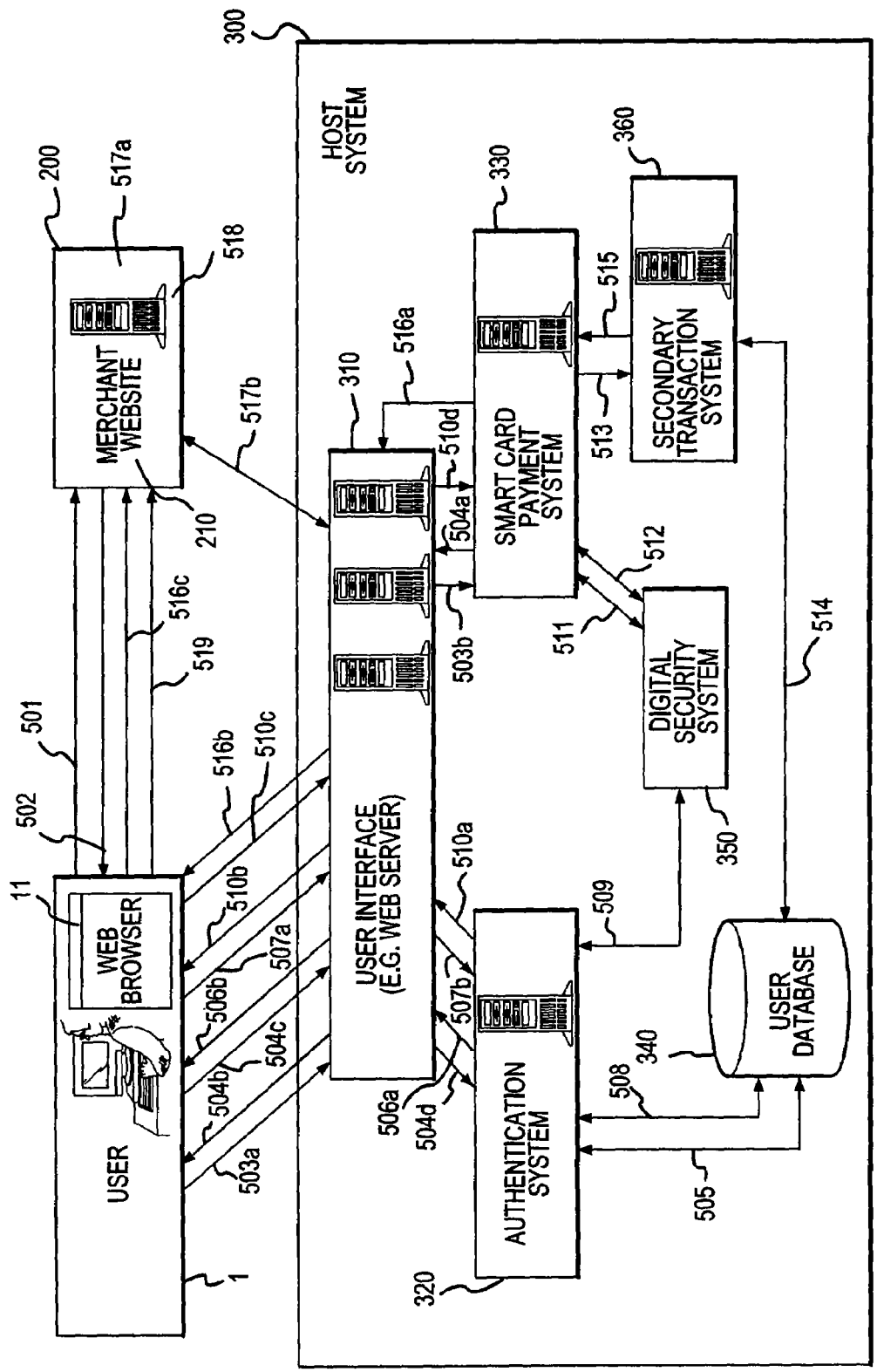
FIG. 4 is a detailed block diagram and process flow of an exemplary embodiment of the present invention.

The host system 300 includes any hardware and/or software suitably configured to facilitate the transaction between the user 1 and the merchant 200. The host system 300 may or may not include open loop financial banking systems such as those utilized by the Visa® or MasterCard® networks or closed loop systems such as those used by American Express®. The host system 300 may also include telephone or utility companies or other account management institutions. The host system 300 includes any "card provider," "card issuer," "charge or credit card company," or other banking, finance or transaction institution. As depicted in FIG. 4, exemplary systems employed by the host system 300 include a user interface system 310 (e.g., web servers), authentication system 320, smart card payment system 330, one or more user databases 340, a digital security system 350, and a secondary transaction system 360.

Figure 5:
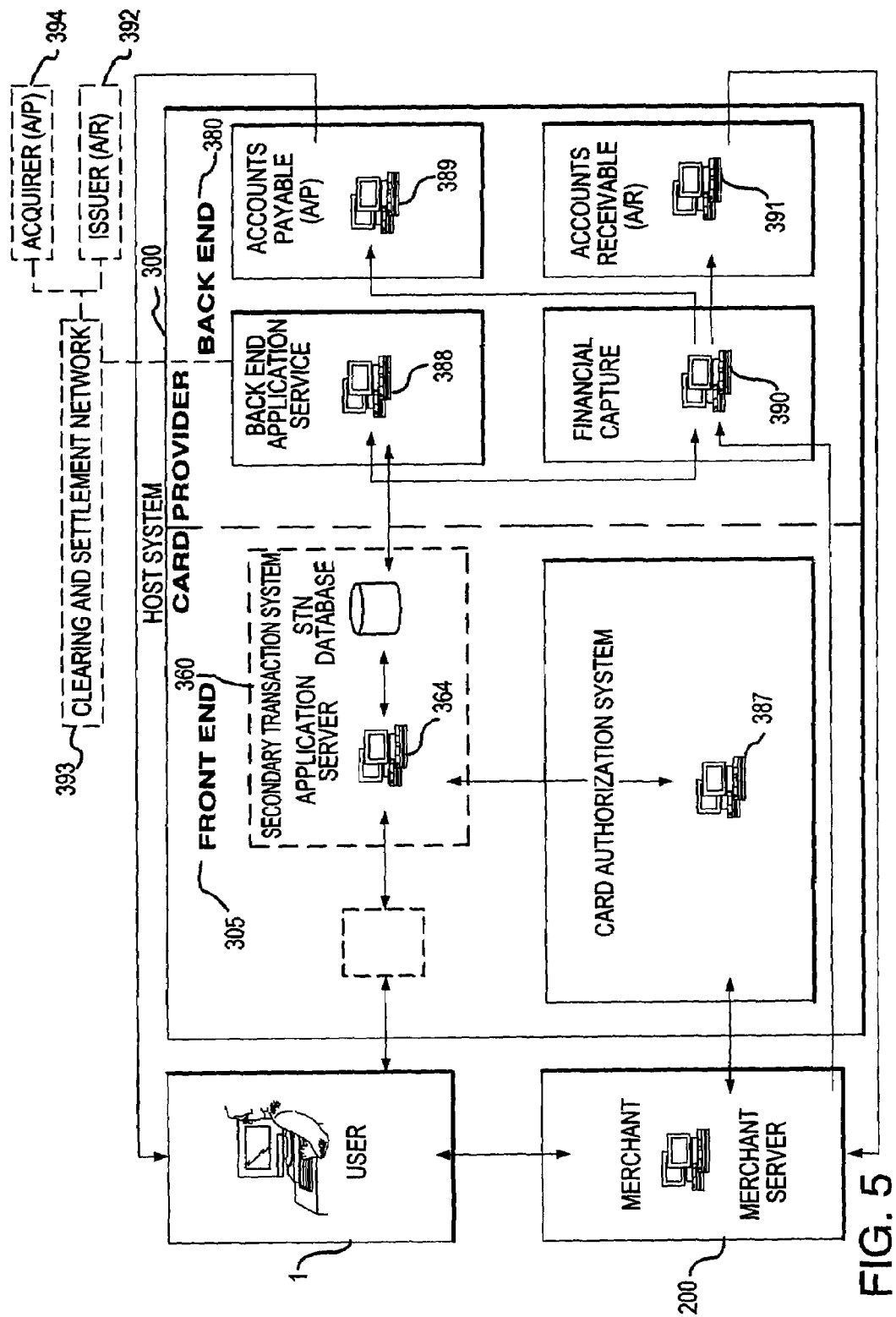
FIG. 5 is a detailed block diagram of the secondary transaction processing and banking systems of an exemplary embodiment of this invention.

As illustrated in FIG. 5, an exemplary host system 300 may also include various front end 305 and back end 380 banking systems that facilitate, inter alia, the generation and processing of the secondary transaction numbers. In addition to the secondary transaction system 360, these systems may include, inter alia, a card authorization system 387, financial capture system 390, accounts receivable system 391, and/or an accounts payable system 389. Although not required, the present invention contemplates open loop banking networks employing a clearing and settlement network 393; and acquirer 394 and/or issuer 392 systems. As will be appreciated by those skilled in computer programming and networking, the above systems may employ suitable application servers and databases, as desired, for storing and processing data.

The secondary transaction number (STN) system 360 generates an STN, which includes temporary or limited use transaction numbers. The STN may be any transaction number, code, symbol, indicia, and/or the like that is associated with another number or account that has been designated by the user 1 or the host system 300 as a primary account number (e.g., the account number embossed on the user's smart card or charge card). In an exemplary embodiment, the STN is a purchasing number that acts as a charge card number and is associated with the user's primary account (e.g., a main charge card, credit, debit card or other account number, such as a bank or brokerage account, reward program account, and/or the like). In an exemplary embodiment, a primary account is not identified by, or derivable from, the STN. In certain embodiments, the primary account may have some identifying elements related to the STN. The primary account is defined herein to include any type of transaction card that references any account, membership, affiliation or association. When more than one user 1 account exists, the primary account is the account that has been designated by the user 1 or the host system 300 as the primary account. Alternatively, there may be a hierarchy of accounts where the STN is associated with one or more primary accounts in a designated order. Additionally, a STN may be associated with two or more accounts. For example, a STN could be associated with a non-currency based (e.g., loyalty points-based) account and also a primary account (e.g., charge card account).

In an exemplary embodiment, the STN and the user's primary account have the same format, although additional embodiments may provide for account numbers with varying formats. In an exemplary embodiment involving credit, debit or other banking cards, the STN has the same industry standard format that is used for the regular banking cards (e.g., 15 or 16 digit numbers). Preferably, the numbers are formatted such that one is unable to tell the difference between a STN and a regular physical charge card. Alternatively, however, the card provider/product identifier (e.g., BIN range, first 6 digits, and/or the like), numbers may be different so as to differentiate the STNs from regular charge card numbers. In referencing the STN and the user's 1 primary account number, it should be appreciated that the number may be, for example, a sixteen-digit credit card number, although each host system 300 has its own numbering system, such as the fifteen-digit numbering system used by American Express®. The host system account numbering generally complies with a standardized format such that a host system using a sixteen-digit format will generally use four spaced sets of numbers, as represented by the number "0000 0000 0000 0000." The first five to seven digits are reserved for processing purposes and identify the issuing bank, card type and/or the like. In this example, the last sixteenth digit is used as a sum check for the sixteen-digit number. The intermediary eight-to-ten digits are used to uniquely identify the user 1. The invention contemplates the use of other numbers, indicia, codes or other security steps in addition to the use of the STN, but in an exemplary embodiment, only the STN 15 is provided to the merchant 200 to facilitate payment for a transaction.

In an exemplary embodiment, the STN is randomly and instantaneously generated by the host system 300, usually upon a user's request, and can be distributed to the merchant 200 by a variety of methods (e.g., online, telephone, wireless, email, dedicated network, and/or the like), which may or may not include encryption/decryption or other cryptographic techniques, however, all of which should be secure and dependent upon verification of the user's identity.

In an exemplary embodiment, the STN may have limited-use (or conditions-of-use) parameters placed upon it by either the user 1, merchant 200, or the host system 300 in order for the numbers to be restricted for particular uses. Alternatively, the user 1 is able to choose system default parameters of use. Parameters may include, for example: (1) use of the STN is good for a predetermined number of transactions; (2) user-determined expiration dates (i.e., STN will be generated with expiration dates that are associated but unrelated to the expiration date of the user's primary account number, other than that it cannot exceed the expiration date of the primary account); (3) limiting use of the STN to a specified dollar amount, dollar amount per transaction, total dollar amount for pre-designated number of transactions, maximum dollar amount per month, and/or the like; (4) use of the STN for a specified merchant only; (5) restricting use to a specified user, other than primary user (e.g., child, spouse, gift recipient, and/or the like); or (6) any combination of these or similar features, for example, a number can be used at a specified merchant only for a pre-designated number of transactions and for a maximum dollar amount. In an exemplary online embodiment, a user 1 may desire that all online transactions (e.g., purchases) be performed using only STNs, or alternatively, be performed only with specific merchants as defined. If the user 1 (or another individual) uses a physical charge card number for an online payment in violation of this condition, the host system 300 would decline the authorization.

These parameters not only provide increased security, allowing a user 1 to tailor the STN to a particular use, but an ancillary benefit of allowing a user 1 to select preferences to control spending for themselves or others who have registered eligibility to use the card (e.g., spouse, children, and/or the like). These preferences may include: restrictions (user 1 may choose to restrict use on certain sites or can pre-approve spending at particular sites); date range (user 1 can select a period of time when transactions may occur); maximum budget amount (user 1 can pre-set spending limits within certain periods of time or in certain categories (e.g. groceries, books, clothing); credit and balance availability (user 1 can check credit or demand deposit balance availability prior to transacting); non-currency based accounts, such as Reward Points as Currency (user 1 can use reward points (e.g., Membership Rewards™, Blue Loot™) as currency to pay for purchases); and Gift Products (user 1 can use a STN to fund gift products to others for designated amounts).

The present invention contemplates an online card-present transaction system that overcomes the problems and expense inherent with online digital wallets and merchant profiling by obtaining the transaction fields directly from the merchant 200. The merchant transaction fields are provided by the merchant 200. Whenever the merchant 200 modifies the transaction fields, the host system is notified.

FIGS. 2*a*-*b* and 3*a*-*b* illustrate exemplary embodiments for completing an online transaction using the system and methods of the present invention. A user 1 shopping at a merchant website 210 is typically presented with a number of merchant web pages during the process of completing a typical online transaction. The merchant 200 generally presents the user 1 with a myriad of shopping options in one or more shopping web pages 212. Desiring to purchase items from the merchant shopping pages 212, the user 1 selects items to be purchased into a virtual shopping cart at the merchant's shopping cart web page 214 or inputs desired items into the checkout page or any other system or method for selecting and purchasing items known in the art.

The user 1 is then presented with the merchant checkout or payment web page 216 (STEP 401, FIGS. 2*a*-*b*). In general, FIGS. 2*a* and 3*a* illustrate an exemplary embodiment where the user 1 is redirected to the host system website 310 for authentication and payment instruction, while FIGS. 2*b* and 3*b* illustrate an exemplary embodiment where the merchant 200 maintains control of the user 1 throughout the completion of the transaction process. The embodiment shown in FIGS. 2*b* and 3*b* may be preferable to larger merchants who are reluctant to give up control over the user 1 during the transaction process and who prefer to direct the transaction process themselves. The embodiment shown in FIGS. 2*a* and 3*a* may be preferable to smaller merchants who desire for the host system 300 to complete various aspects of the transaction process and do not have the resources or capacity to manage the flow of data through the merchant's 200 system to the host system 300. Although the exemplary embodiment shown in FIGS. 2*b* and 3*b* provide the merchant with greater control over the transaction process, it generally includes additional modification and programming of the merchant 200 systems.

Continuing with the illustrations in FIGS. 2*a*-*b* and 3*a*-*b*, in an exemplary embodiment, the merchant website is configured with suitable scripting code, such as JavaScript, VBScript, CGI, and/or the like, to recognize the presence in the user's software of host system files relating to the smart card reader 12. When the merchant 200 system detects the presence of a smart card reader 12 during the online checkout or payment process, the merchant system generates and presents to the user 1 the smart card payment button 218 that is shown in FIGS. 3*a* and 3*b* (STEP 402, FIGS. 2*a*-*b*).

With respect to a first exemplary embodiment, depicted in FIGS. 2*a* and 3*a*, upon selecting button 218, the user 1 is redirected to the host system website 310. The host system 300 challenges the user 1 for authenticating information by presenting the user 1 with an authentication window 320 where the user is prompted to insert his or her smart card 14 and enter the appropriate PIN (STEP 404). The user 1 enters the PIN and the information is transmitted to the host system 300 (STEP 405). The host system 300 verifies the authenticating information received from the user 1, and confirms the identity of the user 1. This may be accomplished as previously noted by two-factor authentication. The host system 300 retrieves user 1 account information and, if more than one user 1 account exists, presents the user 1 with a payment selection page 322, where the user 1 is prompted to select an account. After the user 1 selects the account, the host system 300 generates a temporary use STN. This STN and any other relevant user information (e.g., billing address, name, expiration date, and/or the like) is transmitted to the user 1 (STEP 406) and then passed on to the merchant's web server 210 (STEP 407).

In an exemplary embodiment shown at STEP 408*a*, SSL or other secure communication techniques ensures the secure communication of the STN (and other transaction data, such as name and expiration date) to the merchant 300, while the host system 200 is authenticated using, for example, private/public key (PKI) encryption technology. For example, using an exemplary PKI encryption method, the host system provides the merchant 200 with a public key, while retaining the private key. With this public key, the merchant 200 is able to verify that the transaction data originated with the host system 300. Furthermore, not only is the host system 300 authenticated to the merchant 200, but, in an exemplary embodiment, a message digest created by the hash-value PKI encryption validates the data to the merchant 200, thereby ensuring the merchant 200 that the data originated from the host system 300 and is intact.

In an alternative exemplary process shown in STEP 408*b*, to establish a secure communication channel between the merchant 200 and host system 300, the host system 300, after authenticating the user 1, redirects the user's browser 11 back to the merchant's website 210 with an embedded token (e.g., transaction identifier). A merchant 200 backend system takes this token and communicates with the host system 300 on a second communication channel (e.g., a separate http based internet call) to confirm that the host system 300 issued the token. Once the host system 300 confirms to the merchant 200 that it sent the token, the merchant is assured that the data originated with the host system 300, and again the host system is authenticated to the merchant. The host system 300 then sends the secondary transaction number (and other user transaction data) to the merchant 200 via this secure and authenticated communication channel. Using this data provided by the host system 300, the merchant 200 then completes the transaction process with the user 1 (STEP 409).

FIG. 2*b* illustrates an alternative embodiment, where the merchant 200 system is configured to maintain active control of the user 1 browser during the authentication and STN generation process. This may be desired by some merchants who do not want to send a user 1 to a host system 300 out of concern, for example, that they may loose that valued consumer. The merchant 200 system in this embodiment is configured to act as a throughput of information between the user 1 and the host system 300. As depicted in FIG. 2*b*, the user 1 selects products or services to purchase from a merchant website 210 (STEP 401). The merchant 200 detects the smart card reader 12 on the user 1 device 10 and displays the smart card button 218 (STEP 422). The user 1 then chooses to use the smart card payment system by selecting the smart card button 218 (STEP 423). The Merchant 200 calls the host system 300 using a secure and authenticated channel (e.g., SSL) to retrieve a challenge (e.g., to insert card and enter PIN) from the host system (STEP 424). This challenge is passed along to the user 1 (STEP 425) within a merchant authentication web page 320. The user 1 inserts the smart card 14 and enters the proper PIN in the appropriate authentication field 321 (STEP 426). A signed challenge string and a digital certificate are passed to the merchant 200 and on to the host system (STEP 427). The host system 300 authenticates the user 1, identifies the user's account information, and if more than one user account is available, provides the user the ability to select from multiple accounts on the merchant's account selection page 322. For example, the user 1 may be presented with a list of the last four digits of the available account numbers. A STN is generated and associated with the selected user 1 account in a host system 300 STN database. During settlement, the actual user 1 account number is resubstituted for the STN and processed for payment and invoicing. The STN is provided (along with other transaction data if desired) directly to the merchant 200 (STEP 428). The initial transaction is completed when the merchant 200 accepts the secondary transaction number (and other transaction data) from the host system 300 and notifies the user 1 (STEP 429).

A detailed process flow diagram is presented in FIG. 4 illustrating with more particularity exemplary processes of the present invention. The processes are described herein in three phases: (1) authentication of user, (2) account retrieval and generation of secondary transaction number, and (3) providing the secondary transaction number (and other transaction data) to the merchant via a communication channel with improved security. It should be appreciated that although this invention contemplates the generation of a secondary transaction number (and other transaction data), this is not required.

User Authentication

As shown in FIG. 4, a user 1 shopping at an online merchant's website, adds items to the online shopping cart. The user chooses to checkout and is provided with the merchant's payment page (STEP 501). The form of the payment page is sent from the merchant's website 210 to the user's browser 11 and includes JavaScript and VBScript to detect the presence of a smart card reader 12. If the reader software is detected, then the user 1 is shown the "Use SCP" option, which invokes the smart card payment (SCP) process (STEP 502). The user 1 selects the "Use SCP" option, which causes the user browser 11 to be directed to the host system 300 user interface 310 (e.g., web server) (STEP 503*a*) and then to the smart card payment (SCP) system 330 (STEP 503*b*). The SCP system 330 may include, as appropriate, application servers and databases for processing, storing and managing data. The SCP system 330 saves the user 1 request and redirects the user's browser to an authentication system 320 for appropriate sign-on and authentication (STEPS 504*a-d*). The authentication system 320, via a suitable sign-on routine, obtains a challenge string from an appropriate user database system 340 (STEP 505). The user 1 is challenged to insert his or her smart card 14 into the smart card reader 12 and enter the appropriate PIN (STEPS 506*a-b*)—although, as previously noted, any suitable authentication technique is appropriate. In this exemplary embodiment, the user 1 enters the PIN, resulting in the challenge string being signed and returned, with a digital certificate, to the host system authentication system 320 (STEP 507*a-b*). The digital certificate and the signed challenge string is passed to the user database system 340 where the user 1 is identified from within various user and/or account information database tables (STEP 508). The user may thus be authenticated by comparing the digital certificate to the signed challenged string or by comparing either the digital certificate or the signed challenged string to a third data set stored in the user and/or account information database tables. It should be appreciated that the data structure may be configured in any number of suitable ways, comprising a plurality of servers and databases as desired. The authentication system 320 signs the user a into the host system's security system 350 that facilitates the secure exchange of data between servers and databases (STEP 509).

Generation of a Secondary Transaction Number

The authentication system 320, may in an exemplary embodiment, set a cookie in the user's browser and return the user 1 to the SCP system 330 (STEPS 510a-d). The SCP system 330 verifies the cookie and obtains the user account that the user 1 used to sign-in with (i.e., account associated with the smart card 14 swiped through the smart card reader 12) (STEP 511). Alternatively, although not shown, the user 1 may be prompted to choose the account he or she desires to use to facilitate the purchase. This alternative embodiment may be utilized where the smart card 14 does not also function as a charge card, but is instead a simple identification card (with an embedded smart chip) or other authentication device (e.g., voice, retinal, fingerprint recognition, bar code, and/or the like). As such, the user 1 would be authenticated using the identification card, and prompted to select the desired user account. The SCP system 330 then obtains the user 1 account information (name, account number, expiration date) from the digital security system 350 (STEP 512). The SCP system 330 calls the secondary transaction number (STN) system 360 to request a secondary transaction number (STN) (STEP 513). The STN system 360 interfaces with a user database system 340, where the STN is generated and associated with the user's designated account (STEP 514). This STN-user account association is stored within the user database system 340 for later retrieval and re-substitution, as desired, during transaction authorization and settlement. The STN is then returned to the SCP system 330 (STEP 515).

Transmitting the Secondary Transaction Number To the Merchant

In an exemplary embodiment, once the SCP system 330 has identified the user 1 and generated a STN, this STN is transmitted by the host system 300 to the merchant 200 via an authenticated communication channel (e.g., a separate internet connection, dedicated connection, and/or the like). In an exemplary embodiment, as noted above, the SCP system 330 generates an encrypted host system signature (token) and returns the STN (and other transaction data, if desired) to the merchant 200 by embedding the data packet in the user's browser 11 and redirecting the user's browser back to the merchant 200 (STEP 516a-c). The merchant 200 may configure its computer systems to decode the signature to validate that the data packet originated from the host system 300 and to confirm the user's identification (STEP 517a).

Although various methods for encrypting/decrypting the data are possible, one method incorporates public/private key encryption technology where participating merchants are provided with the public key to decrypt the encrypted token and data packet.

In an alternative exemplary embodiment, the merchant 200, upon receiving the data packet with the embedded token, may communicate directly back to the host system 300 over a second communication channel to confirm that the token originated with the host system (STEP 517b). Once this second communication channel is established and the identity of the host system confirmed, data may be transmitted more confidently between the host system 300 and merchant 200 in order to facilitate the transaction for the user 1.

In an exemplary embodiment, the host system 300 may desire to provide a special transaction code to the merchant 200 indicating that the transaction was completed using the smart card payment merchant interface system. This transaction code may then be used by the merchant 200 in the case of a dispute resolution process. Once the secondary transaction number is accepted by the merchant 200 (STEP 518), the transaction process is completed (STEP 519).

It should be understood, however, that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. An online card present transaction method comprising:
    generating an encrypted host computer signature;
    embedding said signature in a browsing window;
    directing said browsing window to a merchant, wherein said merchant authenticates an identity of said host computer by decrypting said host computer signature;
    detecting, by a host computer, the presence of a smart card reader connected to a client computer;
    presenting to a user a payment option for using a smart card for payment in response to the detection of the smart card reader;
    receiving a selection by said user of said payment option;
    prompting said user to insert a smart card into said smart card reader;
    receiving a digital certificate from said smart card;
    generating a secondary transaction account number based on authentication of said digital certificate, wherein said secondary transaction account number is valid for a single purchase transaction;
    associating said secondary transaction account number with said transaction account of said user; and,
    communicating said secondary transaction account number over said authenticated communication channel to a merchant, wherein said merchant submits a payment request based on said secondary transaction account number.

2. The method of claim 1, wherein said host computer causes said merchant to validate account information communicated from said host computer to said merchant.

3. The method of claim 1, wherein said host computer further performs the steps of:
    communicating a host computer token to said merchant over a first communication channel;
    retrieving from said merchant, over a second communication channel, a request to verify that a host computer issued said token; and
    confirming to said merchant that said host computer issued said token.

4. The method of claim 3, further comprising the steps of:
    retrieving from said merchant, over a second communication channel, a request to verify that said host computer issued said account information; and
    confirming to said merchant that said host computer issued said account information.

5. The method of claim 1, wherein said prompting step further comprises transmitting, to said client computer, a challenge string in response to said selection by said user, wherein said challenge string prompts said user to insert a smart card into said smart card reader.

6. The method of claim 1, wherein said smart card stores said digital certificate.

7. The method of claim 1, further comprising receiving, at said host computer, said digital certificate and a signed challenge string from said client computer, wherein said challenge string is signed to create the signed challenge string.

8. The method of claim 7, wherein said signed challenge string is accessed in response to the user entering a Personal Identification Number (PIN).

9. The method of claim 7, wherein said digital certificate is accessed in response to the user entering a Personal Identification Number (PIN).

10. The method of claim 1, wherein said generating step comprises authenticating, at said host computer, said smart card using a signed challenge string and said digital certificate.

11. The method of claim 1, wherein said authentication process comprises the steps of:
    embedding an encrypted host computer signature in said client computer of said user; and
    redirecting a browser of said client computer to said merchant, causing said merchant to authenticate said host computer by decrypting said host computer signature.

12. The method of claim 1, wherein said authentication process comprises the steps of:
    communicating a token to said merchant over a first communication channel;
    receiving a communication from said merchant over a second communication channel requesting said host computer to confirm issuance of said token; and
    confirming to said merchant that said host computer issued said token.

13. An online-card-present transaction method comprising:
    authenticating an identity of a host computer by decrypting a host computer signature, wherein said host computer:
        generates an encrypted host computer signature;
        embeds said signature in a browsing window of a client computer; and,
        directs said browsing window to a merchant;
    detecting the presence of a smart card reader connected to said client computer by a merchant computer;
    presenting a user of said client computer with a payment option for using a smart card for payment in response to the detection of the smart card reader;
    receiving a selection by said user of said payment option;
    redirecting said client computer to a website of a host computer in response to said detection, wherein said host computer:
        prompts said user to insert a smart card into said smart card reader;
        receives a digital certificate from said smart card;
        generates a secondary transaction account number based on authentication of said digital certificate, wherein said secondary transaction account number is valid for a single purchase transaction; and,
        associates said secondary transaction account number with an account of said user;
        communicates said secondary transaction account number to said client computer, wherein said user of said client computer submits a payment request based on said secondary transaction account number; and,
    receiving account information including said secondary transaction account number from said host computer over said authenticated communication channel, wherein said account information and said secondary transaction account number facilitates completion of a transaction between said user and a merchant.

14. The method of claim 13, wherein said host computer causes said merchant to validate account information communicated from said host computer to said merchant.

15. The method of claim 13, wherein said host computer further:
    communicates a host computer token to said merchant over a first communication channel;
    retrieves from said merchant, over a second communication channel, a request to verify that a host computer issued said token; and
    confirms to said merchant that said host computer issued said token.

16. The method of claim 15, further comprising the steps of:
    retrieving from said merchant, over a second communication channel, a request to verify that said host computer issued said account information; and
    confirming to said merchant that said host computer issued said account information.

17. The method of claim 13, wherein said host computer further:
    transmits a challenge string to said client computer, wherein said challenge string prompts said user to insert said smart card into said smart card reader, wherein said smart card stores a digital certificate;
    receives a copy of said digital certificate and a signed challenge string from said client computer, wherein said challenge string is signed to create the signed challenge string and said digital certificate is accessed in response to the user entering a Personal Identification Number (PIN); and,
    authenticates said smart card using said signed challenge string and said copy of said digital certificate.

18. The method of claim 13, wherein said step of generating said secondary transaction account number comprises the steps of:
    receiving an encrypted host computer signature; and
    decrypting said encrypted host computer signature to determine that said account information originated with said host computer.

19. The method of claim 13, further comprising the steps of:
    establishing an authenticated communication channel;
    receiving a host computer token over a first communication channel, wherein said token identifies said host computer; and
    communicating to said host computer over a second communication channel to confirm that said token was issued by said host computer.

20. An online card-present transaction method, comprising:
    transmitting to a merchant computer a request to facilitate a transaction with a merchant, wherein said merchant computer authenticates an identity of a host computer by decrypting a host computer signature, wherein said host computer generates an encrypted host computer signature, embeds said signature in a browsing window of a client computer and directs said browsing window to a merchant, wherein said merchant an identity;
    receiving a payment option for using a smart card for payment in response to said merchant computer detecting a presence of a smart card reader connected to a client computer, wherein said merchant computer and said client computer communicate over a network;

transmitting a selection by said user of said payment option;

receiving a prompt from said merchant computer to insert said smart card into a smart card reader; and, transmitting a digital certificate from said smart card to a host computer, wherein said host computer retrieves a primary transaction account number associated with said digital certificate and generates a secondary transaction account number that is transmitted to said merchant computer.

* * * * *

UNITED STATES PATENT AND TRADEMARK OFFICE
CERTIFICATE OF CORRECTION

PATENT NO. : 7,415,443 B2  Page 1 of 1
APPLICATION NO. : 11/860356
DATED : August 19, 2008
INVENTOR(S) : Carol Lee Hobson et al.

It is certified that error appears in the above-identified patent and that said Letters Patent is hereby corrected as shown below:

In column 16, line 18, please delete "compnsing" and insert therefor --comprising--.

In column 18, line 62, please delete ", wherein said merchant an identity".

Signed and Sealed this

Twenty-fifth Day of November, 2008

JON W. DUDAS
*Director of the United States Patent and Trademark Office*